United States Patent [19]

Subramanian et al.

[11] Patent Number: 5,208,205
[45] Date of Patent: May 4, 1993

[54] CATALYST SYSTEM FOR CONVERTING EMISSIONS OF A LEAN-BURN ENGINE

[75] Inventors: Somasundaram Subramanian, Melvindale; Robert J. Kudla, Warren; Mohinder S. Chattha, Northville, all of Mich.

[73] Assignee: Ford Motor Company, Dearborn, Mich.

[21] Appl. No.: 772,410

[22] Filed: Oct. 7, 1991

[51] Int. Cl.$^5$ .......................... B01J 21/04; B01J 23/40
[52] U.S. Cl. .................................... 502/333; 502/320; 502/332; 502/334; 502/346; 423/213.5
[58] Field of Search ............... 502/333, 334, 320, 332, 502/346; 423/213.5

[56] References Cited

U.S. PATENT DOCUMENTS 4,087,384 5/1978 Davis .................................. 502/333
4,111,848 9/1978 Torii et al. ...................... 502/334 X

OTHER PUBLICATIONS

Kintaichi et al., "Selective Reduction of Nitrogen Oxides With Hydrocarbons Over Solid Acid Catalysts in Oxygen-Rich Atmospheres", Catalysis Letters, vol. 6, 1990, pp. 239-244.

*Primary Examiner*—W. J. Shine
*Attorney, Agent, or Firm*—Joseph W. Malleck; Roger L. May

[57] ABSTRACT

A catalyst system for attaining high conversions of NO, HC, and CO in a fuel-lean emission flow (i.e., containing $SO_2$, $H_2O$, $H_2$, and considerable excess oxygen), the system comprising: (a) a first stage reducing catalyst for treating the nitric oxide emissions, the catalyst containing highly acidic gamma alumina (i.e., with a $pH_{pzc}$ of less than 3); (b) means for injecting gaseous or liquid reductants into the emission stream prior to entering said first stage catalyst, said first stage catalyst temperature being selected to be in the range of 550°–650° C.; and (c) an oxidation catalyst effective for treating the effluent from the first stage catalyst.

Another aspect of this invention is a method of treating the exhaust gas from a fuel-lean emission flow from a fossil-fueled internal combustion engine having a redox ratio of 0.02–0.09, the method comprising: (a) injecting a gaseous or liquid HC or oxygenated HC reductant into the emission stream at a location where the stream is within the temperature range of 550°–650° C.; (b) immediately exposing the injected stream to a first stage catalyst containing acidic gamma alumina with a $pH_{pzc}$ of less than 3; and (c) exposing the effluent from the first stage catalyst to an oxidation catalyst that is effective in ensuring that the NO, HC, and CO in the emissions are each converted to at least 80%.

12 Claims, 5 Drawing Sheets

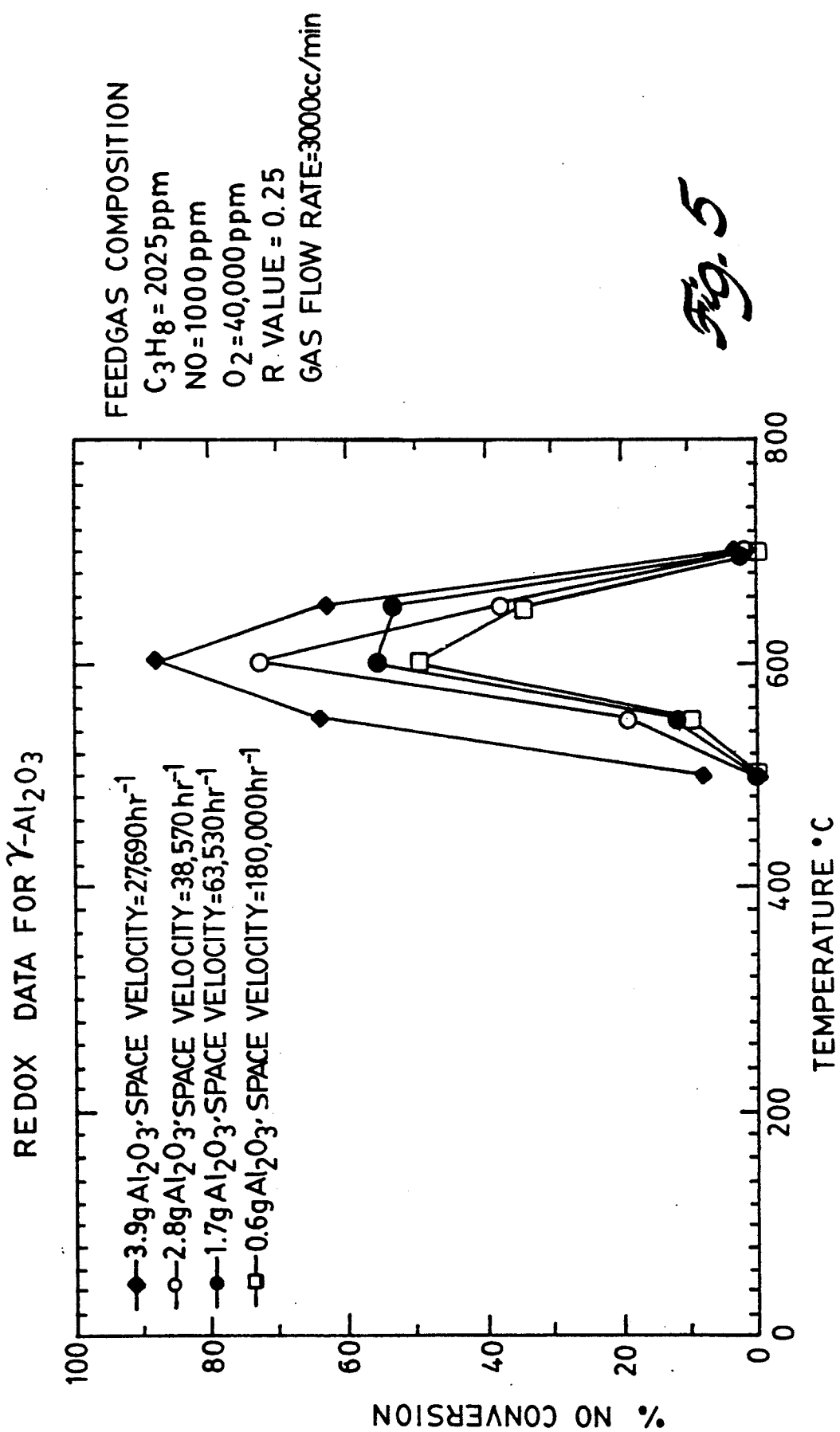

CATALYST SYSTEM FOR CONVERTING EMISSIONS OF A LEAN-BURN ENGINE

BACKGROUND OF THE INVENTION

1. Technical Field

This invention relates to the technology of cleansing the emissions of an automotive internal combustion engine by effectively removing not only nitric oxide in the emissions but also hydrocarbons and CO when the engine exhaust is lean (excess of oxygen).

2. Discussion of the Prior Art

Three-way catalysts (TWC) have been commercially employed for some time in the cleansing of emissions from fossil-fueled automotive engines that are operated at or slightly rich of stoichiometry. These catalysts have usually been employed as a combination of noble metals including platinum, palladium, and rhodium. If the same three-way catalysts were to be employed to cleanse emissions from a lean-burn engine, the excess oxygen in the exhaust of such an engine would render the operation of a conventional TWC ineffective, particularly with respect to nitric oxides.

The prior art has developed several oxidation catalysts for removal of CO and hydrocarbons which will function in an excess oxygen environment; examples of such oxidation catalysts include noble metals such as platinum and palladium, and base metals such as copper, cobalt, and chromium. Unfortunately, such oxidation catalysts are not effective in reducing nitric oxide or other reducible elements of the emissions.

The prior art has discovered certain selective catalytic reduction agents such as ammonia and urea, which are highly effective in reducing nitric oxide from stationary source emissions, particularly when deployed over titania supported catalysts such as $V_2O_5$-$TiO_2$. Unfortunately, such agents are unsuitable for vehicular use since they are toxic and restrict the conditions for use.

Recently, transition metal ion exchanged zeolites have been deployed as catalysts for vehicular use, particularly in diesel engines (see German patents 3,642,018 and 3,735,151). Such zeolite catalysts suffer from high temperature degradation and poor NO conversion efficiency at low temperatures; moreover, such catalysts require that the engine be run rich at least temporarily to generate sufficient reductants in the emission flow.

Even more recently, tests have been made using propane as a reductant over an alumina catalyst to reduce NO in an oxygen-rich flow (see "Selective Reduction of Nitrogen Oxides With Hydrocarbons Over Solid Acid Catalysts In Oxygen-Rich Atmospheres", Y. Kintaichi, H. Hamada, M. Tabata, M. Sasaki, T. Ito, *Catalysis Letters*, Vol. 6, 1990, pp. 239-244). Conversion of NO was low even under the ideal conditions used (323 ppm propane, low space velocity of 3000 $hr^{-1}$, extremely low R, and an absence of contaminants in the emission flow). Presence of emission contaminants can reduce NO conversion efficiency in half, making the results even more disappointing. Moreover, each of the above references fails to disclose a catalyst system that is suitable for vehicular on-board use and attain desirably high conversion efficiency of NO at high space velocities and lean-burn conditions.

SUMMARY OF THE INVENTION

This invention has discovered a way in which a gaseous or liquid reductant can be metered in precise amounts to match the varying amounts of nitric oxide that may appear in the exhaust gas of a lean-burn engine. This reductant is successful in reducing nitric oxide over an acidic gamma alumina first stage catalyst. This first stage is followed by an oxidation catalyst suitable for treating the effluent from the first stage. Accordingly, the first aspect of this invention is a catalyst system for attaining high conversions of NO, HC, and CO in a fuel-lean emission flow (i.e., containing $SO_2$, $H_2O$, $H_2$; and considerable excess oxygen), the system comprising: (a) a first stage reducing catalyst for treating the nitric oxide emissions, the catalyst containing highly acidic gamma alumina (i.e., with a $pH_{pzc}$ of less than 3); (b) means for injecting gaseous or liquid reductants into the emission stream prior to entering said first stage catalyst, said first stage catalyst temperature being selected to be in the range of 550°-650° C.; and (c) an oxidation catalyst effective for treating the effluent from the first stage catalyst.

Another aspect of this invention is a method of treating the exhaust gas from a fuel-lean emission flow from a fossil-fueled internal combustion engine having a redox ratio of 0.02-0.09, the method comprising: (a) injecting a gaseous or liquid HC or oxygenated HC reductant into the emission stream at a location where the stream is within the temperature range of 550°-650° C.; (b) immediately exposing the injected stream to a first stage catalyst containing acidic gamma alumina with a $pH_{pzc}$ of less than 3; and (c) exposing the effluent from the first stage catalyst to an oxidation catalyst that is effective in ensuring that the NO, HC, and CO in the emissions are each converted to at least 80%.

BRIEF DESCRIPTION OF THE DRAWINGS

FIG. 5 is a graphical illustration of the percent conversion efficiency for $NO_x$ as a function of temperature with varying amounts of acidic gamma alumina as catalyst and propane as reductant; the space velocities reported are for alumina powder.

DETAILED DESCRIPTION AND BEST MODE

The "lean-burn" engine strategy is one of the most promising technologies being investigated to improve the fuel economy of vehicles. Such an engine uses an oxygen-rich gas mixture and operates with an air/fuel (A/F) ratio of 15-27, particularly 19-25. Approximately 1.5-10% oxygen will be present in the emission stream from such internal combustion engines fueled by conventional fossil fuels. The exhaust gas composition may also be defined in terms of the redox ratio which is the ratio of reducing to oxidizing components in the gas mixture and is in the range of 0.01-0.9. The exhaust gas composition may also be defined by lambda which is the ratio of the operating A/F ratio to the stoichiometric A/F ratio for a given fuel and is in the range of 1.1-1.8. But, importantly, such engine emissions will contain contaminants to selective reduction, including $SO_2$, $H_2O$, $H_2$, and CO. These contaminants markedly affect catalysis as shown by comparative data in Table 1.

Figure 1:
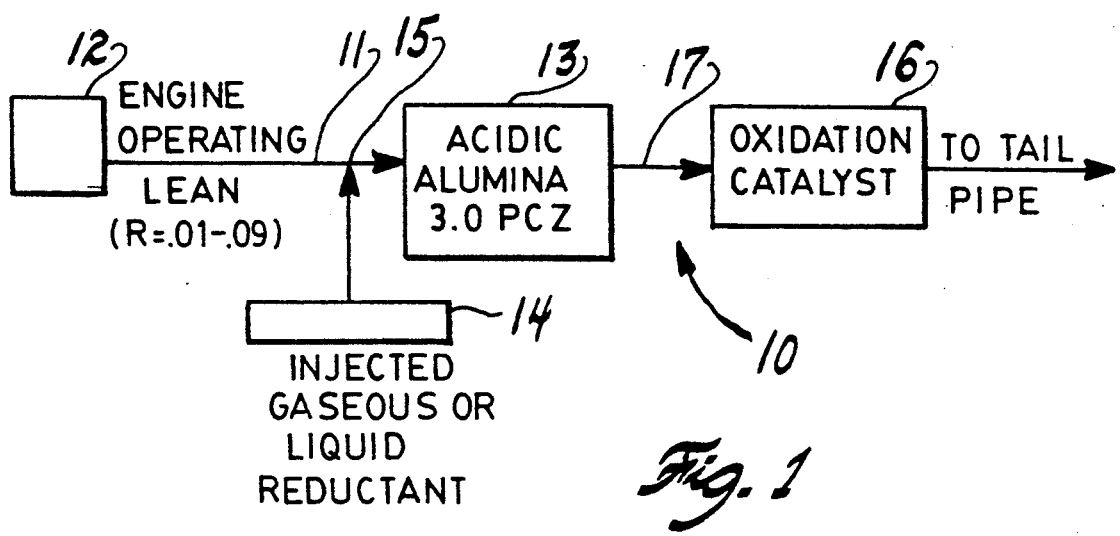
FIG. 1 is a block diagram of the preferred system of this invention.

As shown in FIG. 1, the catalyst system 10 of this invention is capable of attaining high conversion efficiencies (greater than 80%) of $NO_x$, HC, and CO in a fuel-lean emission flow 11 (oxygen concentration of 1.5-10%) from a fossil-fueled engine 12. The system comprises a first stage catalyst 13 containing highly acidic gamma alumina, means 14 for injecting gaseous or liquid reductant (as propylene or its equivalent) into the emission flow 11 at a location 15 prior to entering the first stage catalyst 13, the location being selected so as to have the first stage catalyst at a temperature in the range of 550°-650° C., and an oxidation catalyst 16 effective to treat the effluent 17 from the reducing catalyst. The amount of injected reductant (propylene or its equivalent) must be in an amount required based on the NO conversion desired and generally is no greater than the stoichiometric amount calculated based on the composition (all species) of the exhaust gas being treated.

It is essential that the first stage catalyst be highly acidic gamma alumina (<3.0 $pH_{pzc}$), and if commercially available alumina is utilized, such alumina must be further acidified. Commercial aluminas have $pH_{pzc}$ (point of zero charge) that ranges from about 5-9 (see S. L. Chen et al, Applied Catalysis, 73, p. 289-312, particularly p. 300, 1991). The author has also measured other low and high surface area aluminas from commercial sources which ranged from 7.2-8.5.

The first stage catalyst 13 may be prepared by acidifying alumina with acids such as HCl, $H_2SO_4$, HF, or $H_3PO_4$ and salts such as $AlCl_3$, $NH_4F$, or $AlF_3$. When HCl is employed to acidify alumina, the alumina is brought into contact with a required volume of HCl (typically in a concentration range of 0.1-10 N) to prepare chlorine-impregnated gamma alumina by incipient wetness. The resulting precursor is dried and calcined. The drying process may be carried out at a temperature of about 120° C. and the calcination process may be carried out at a temperature of about 600° C. for four hours.

Commercially available gamma alumina comes in three different forms: mildly acidic (5-8 $pH_{pzc}$), basic, and neutral. The mildly acidic gamma alumina is ineffective for use when treating exhaust gases containing $SO_2$, $H_2O$, $H_2$, and CO, at temperatures about 600° C. Enhanced acidity is important to this invention because acidification improves nitric oxide conversion with respect to that observed for commercial gamma alumina, as shown in Table 1. The inventors have observed a correlation between acidity and catalytic effectiveness of the alumina catalyst. Acid centers or sites in gamma alumina are responsible for increasing catalytic activity to reduce $NO_x$ with propylene or its equivalent. It is speculated that the more acid centers or sites there are (or higher acid strengths) in gamma alumina, the greater will be the catalytic activity. The acidification is performed to promote such acid centers or sites. The acidic alumina is preferably characterized by strong acid centers resulting in strong Lewis or Bronsted acidity, having a point of zero charge less than 3.

Certain data have been collected, as set forth in Table 1, showing the NO conversion differences that occur over normal alumina as compared to acidified alumina. In these examples, synthesized gas streams were made up having an oxygen content of about 4% and a nitric oxide content of 990 ppm. For each of the five samples, hydrocarbon, CO, $SO_2$, and $H_2O$ were varied. For example, in Example 2, the hydrocarbon was reduced to 750 ppm and there was an absence of CO, $SO_2$, and $H_2O$. In Example 3, CO was present along with hydrogen; in Example 4, $SO_2$ was added without the presence of CO or hydrogen; and in Example 5, CO, $H_2$, $SO_2$, and $H_2O$ were present, which represented a typical exhaust from a lean-burn engine. The redox ratio was varied among some examples. The redox ratio is the ratio of reducing components to the oxidizing components in the feed gas stream.

As indicated in the second and third columns, the acidified alumina consistently showed higher NO conversion which was significant. With the commercially available alumina (mildly acid, 5-8 $pH_{pzc}$) the presence of some contaminants showed a 9% reduction in efficiency (compare examples 2 and 4, and a 40% reduction when all of the contaminants in typical lean-burn emissions are present (compare examples 3 and 5).

TABLE 1

| Conditions | NO Conversion (%) Observed With | |
|---|---|---|
| | Normal Alumina | Acidic Alumina |
| [A] 4% $O_2$, 990 ppm NO, 1195 ppm $C_3H_6$ with R = 0.148 | 84.5 | 94.5 |
| [B] 4% $O_2$, 990 ppm NO, 750 ppm $C_3H_6$ with R = 0.093 | 64.0 | 82.7 |
| [C] 4% $O_2$, 990 ppm NO, 750 ppm $C_3H_6$, 1.5% CO, 0.5% $H_2$ with R = 0.341 | 54.9 | 65.5 |
| [D] 4% $O_2$, 990 ppm NO, 750 ppm $C_3H_6$, 20 ppm $SO_2$, with R = 0.341 | 58.6 | 82.5 |
| [E] 4% $O_2$, 990 ppm NO, 750 ppm $C_3H_6$, 1.5% CO, 0.5% $H_2$, 20 ppm $SO_2$, with R = 0.341@ | 34.6 | 62.3 |

R, the redox ratio, is the ratio of reducing components to the oxidizing components in the feed gas stream.
@represents the typical exhaust of a lean-burn gasoline car exhaust.

The apparatus for injecting the reductant may be a device that atomizes the reductant in the form of a gas or aqueous solution. In the case of an aqueous reductant, the spray pattern of the injector forms a steam/hydrocarbon mixture which is introduced into the stream of the exhaust gases immediately before the entrance to the first stage catalyst. The amount of reductant that is injected is controlled to the amount of $NO_x$ carried by the exhaust gas stream and the $NO_x$ conversion desired, preferably to a ratio of reductant to $NO_x$ in the range of 0.1-10.0. To facilitate such control, the $NO_x$ content of the exhaust gas may be directly measured using an on-board $NO_x$ analyzer/detector. It may also be indirectly estimated by a microprocessor used to measure and control the operating parameters of the engine. This may be a device effective to inject an amount of reductant in accordance with the variance of the instantaneous content of $NO_x$ in the exhaust stream by use of one or more sensors and a microprocessor of the sensor signal; the sensor will provide a direct measurement of the $NO_x$ content of the exhaust stream. Preferably, the injector is effective to introduce $NO_x$ reductant in an amount of 100–5000 ppm of the emission flow.

The reductant may be selected from hydrocarbons and oxygenated hydrocarbons falling within the group consisting of alkanes, alkenes, alkynes, alcohols, esters, ketones, ethers, aldehydes, and aromatics, provided the selection is operative in the temperature region of 550°–650° C. to reduce NO in the presence of contaminants. Examples that are effective in such group comprise: propylene, propane, ethene, ethane, acetylene butadiene, and propanol. Optimally, propylene and propane are most effective. The choice of hydrocarbon used for the reaction depends, among other things (such as safety and cost), on the nature of the contaminants, the NO concentration in the exhaust gas, and the NO conversion desired.

The oxidation catalyst is a base metal oxide or supported noble metal. The supported noble metal catalyst is formed by depositing a suitable noble metal on a refractory oxide support. The oxidation catalyst can be an oxide of copper, cobalt, chromium, or a noble metal catalyst containing palladium or platinum supported on $Al_2O_3$, $TiO_2$, $CeO_2$, or $La_2O_3$.

The method aspect of this invention for treating the exhaust gas of a fossil-fueled engine that has excess oxygen so as to attain high conversion efficiency (greater than 80%) for $NO_x$, hydrocarbon CO, comprises the steps of: (a) injecting a HC reductant into the exhaust gas stream at a location where the exhaust gas has a temperature of 550°–650° C.; (b) exposing the injected exhaust gas mixture to a first stage catalyst consisting of acidic gamma alumina, said exposure preferably being at a space velocity in the range of 5–60 K $hr^{-1}$; and (c) exposing the effluent from the first stage catalyst to an oxidation catalyst effective for treating the remaining noxious elements of said exhaust gas.

The reductant is injected in amount generally based on the $NO_x$ content of the exhaust gas and the desired conversion level. The amount of propylene or its equivalent is injected in an amount desirably no greater than the stoichiometric amount determined based on the composition of the exhaust gas. The redox ratio of the exhaust gas is maintained at less than 1.0 even after the addition of the reductant. For typical automotive exhaust applications, the propylene concentration will range between 300–5000 ppm, and optimally above 1600. The exhaust gas flow rate and the $NO_x$ content of the exhaust gas determine the rate at which the amount of reductant injected. The reductant reacts with nitric oxide over the first stage acidic gamma alumina catalyst and $N_2$ and CO are among the products observed. In addition, acidic gamma alumina catalyzes to a limited extent the oxidation of CO to $CO_2$ and $C_3H_6$ to CO, $CO_2$, and $H_2O$. The unreacted CO, HC (includes injected propylene), and NO flow over the second stage oxidation catalyst. Here CO and HC are oxidized to $CO_2$ and $CO_2$ and $H_2O$, respectively.

EXAMPLES

Several systems were prepared to corroborate the scope of this invention. Each catalyst system contained 5 g of $Al_2O_3$ followed by 0.2 g of a Pd-based oxidation catalyst; these catalyst systems were evaluated using a flow reactor. $N_2$ was used as a carrier gas, and the feed gas flow rate was 3000 cc/min. The temperature of the reactor was held constant at 550° C. The space velocity over the acidic gamma alumina and the oxidation catalysts will be 21 K $hr^{-1}$ and 525 K $hr^{-1}$, respectively, in a pellet/powder type configuration.

Two types of experiments were conducted. In the first situation, a first feed gas composition, consisting of: 1000 ppm NO, 40,000 ppm $O_2$, and variable amounts (360–3000 ppm) of propylene. In the second feed gas composition, it consisted of 1000 ppm NO, 40,000 ppm $O_2$, 15,000 ppm CO, 5000 ppm $H_2$, 20 ppm $SO_2$, and 20,000 ppm $H_2O$. The second feed gas mixture was used to simulate the exhaust gas of a lean-burn engine. 2400 ppm of $C_3H_6$ was added to provide the reducing agent for converting $NO_x$ to $N_2$.

Figure 2:
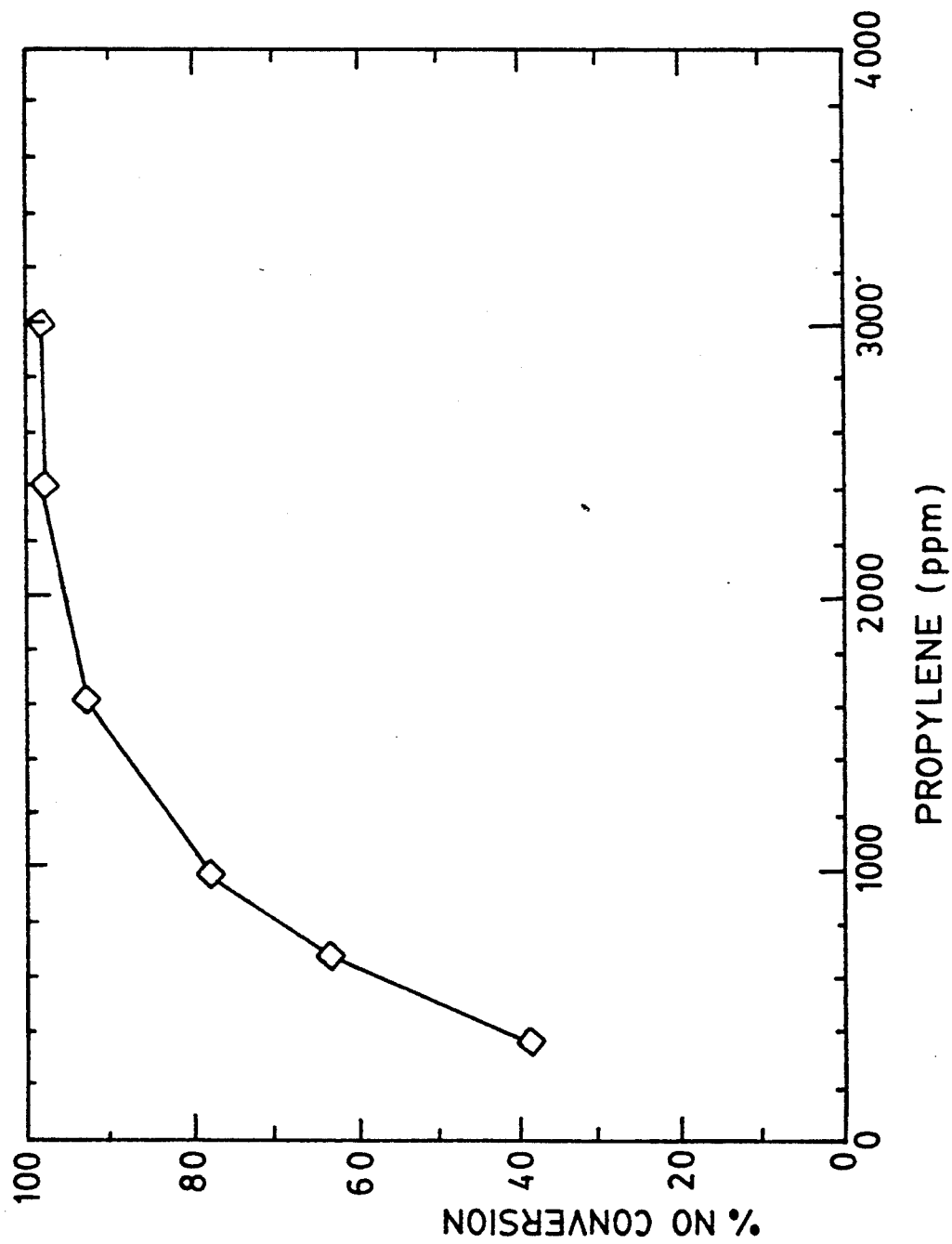
FIG. 2 is a graphical illustration of the variation of percentage conversion efficiency of $NO_x$ as a function of the amount of gaseous propylene injected into the emission stream; the catalyst system consists of acidic gamma alumina (5 g) followed by a palladium based oxidation catalyst (0.2 g).
Figure 3:
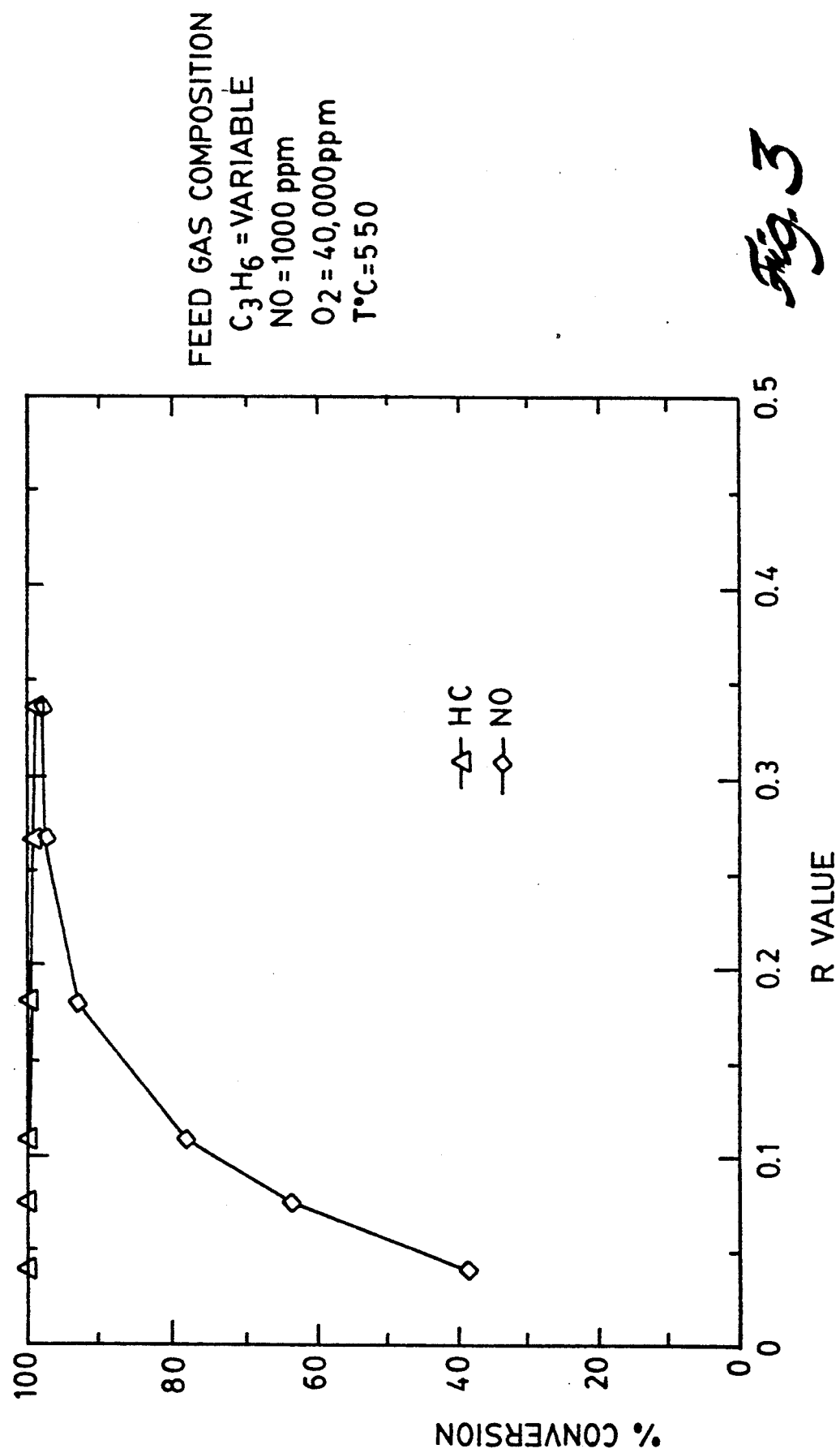
FIG. 3 is a graphical illustration of the percent conversion efficiency of a gaseous constituent of the exhaust gas as a function of redox ratio; the catalyst system consists of acidic gamma alumina (5 g) followed by a palladium based oxidation catalyst (0.2 g).

FIG. 2 shows the nitric oxide conversion (using an exhaust system represented in FIG. 1) as a function of propylene concentration. The nitric oxide conversion varied with the amount of propylene added. The NO conversion is shown as a function of the redox ratio, R, in FIG. 3. The redox ratio, R, is a measure of the A/F ratio. R greater than 1 refers to a fuel-rich gas mixture; R equal 1 refers to a stoichiometric gas mixture; and R less than 1 refers to a fuel-lean gas mixture. Note that the feed gas mixture is lean (R less than 1). It is observed that nitric oxide conversions exceeding 80% are achieved when the propylene concentration is introduced to the exhaust in an amount greater than 1000 ppm.

When the second feed gas is used, which is not shown in any of the Figures, and the propylene being allowed to flow over the catalyst, under these conditions the redox ratio is 0.51 (the redox ratio in the absence of $C_3H_6$ is 0.25). The data performed with this gas shows that NO, CO, and HC conversions were remarkably high, being 96, 92 and 99%, respectively.

Figure 4:
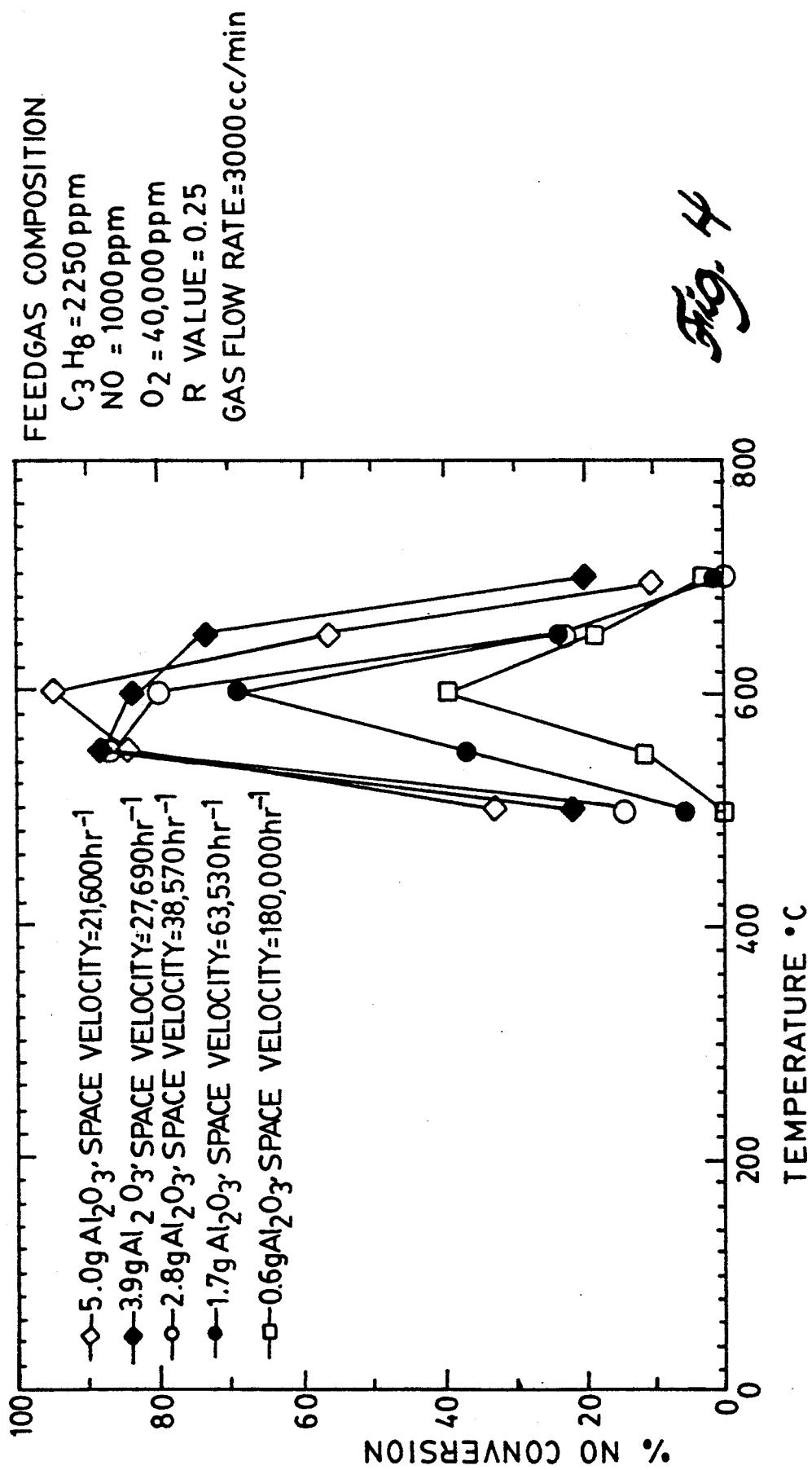
FIG. 4 is a graphical illustration of the percent conversion efficiency for $NO_x$ as a function of temperature with varying amounts of acidic gamma alumina as catalyst and propylene as reductant; the space velocities reported are for alumina powder.

As shown in FIG. 4, when the temperature is between 550°–650° C., there is a pyramidal effect for conversion efficiency which peaks at about 550°–600° C. for reducing NO over gamma alumina at varying space velocities. Note that the lower space velocities give the highest optimal conversion efficiency, reaching 80% or more when the space velocity is between 21,000–180,000 $hr^{-1}$.

FIGS. 4 and 5 indicate that the temperature range over which maximum NO conversion observed is similar in the case of propylene and propane, namely, 500°–700° C. The choice of hydrocarbon used for the reaction depends among other things (such as safety and cost) on the nature of the contaminants, the NO concentration in the exhaust gas, and the NO conversion desired.

We claim:

1. A catalyst system for attaining high conversion of $NO_x$, HC, and CO contained in the emission flow from a lean-burn internal combustion engine, the system comprising:
    (a) a first stage catalyst for treating nitric oxide in said emission flow, said first stage catalyst consisting of highly acidic gamma alumina having a $pH_{pzc}$ of less than 3;
    (b) means for distributing a gaseous or liquid $NO_x$ reductant into said emission stream prior to entering said first stage catalyst when the latter is at a temperature range of 550°–650° C., said reductant being selected from the group consisting of alkanes, alkenes, alkynes, aromatics, alcohols, aldehydes, ketones, ethers, and esters; and
    (c) an oxidizing catalyst effective for treating the effluent from said first stage catalyst.

2. The catalyst system as in claim 1, in which said means for distributing is an injector effective to introduce said $NO_x$ reductant in an amount of 100–5000 ppm of said emission flow.

3. The catalyst system as in claim 1, in which the ratio of reductant to $NO_x$ is in the range of 0.1–10.0.

4. The catalyst system as in claim 1, in which the oxygen content of said emission flow is in the range of 1.5–10%.

5. The catalyst system as in claim 1, in which the acidic alumina is characterized by strong acid centers resulting in strong Lewis or Bronsted acidity. such alumina generally having a point of zero charge less than 3.

6. The catalyst system as in claim 1, in which said emission flow contains $SO_2$, $H_2$, $H_2O$, and CO.

7. The catalyst system as in claim 1, in which said acidic alumina is obtained by acidification of alumina with acids (HCl, $H_2SO_4$, HF, $H_3PO_4$) or salts ($AlF_3$, $AlCl_3$, $NH_4F$).

8. The system as in claim 1, in which said means for distributing comprises a mechanical apparatus for spraying said reductant.

9. The catalyst system as in claim 1, in which said means for distributing is a device effective to inject an amount of reductant in accordance with the variance of the instantaneous content of $NO_x$ in the exhaust stream by use of one or more sensors and a microprocessor of the sensor signal.

10. The catalyst system as in claim 9, in which said sensor provides a direct measurement of the $NO_x$ content of the exhaust stream.

11. The catalyst system as in claim 1, in which said oxidation catalyst is a base metal oxide or a supported noble metal catalyst.

12. The catalyst system as in claim 9, in which said microprocessor indirectly estimates the $NO_x$ content of the exhaust stream based on the operating conditions of the engine.

* * * * *